Jan. 5, 1926.
A. McD. McAFEE
1,568,171
RECOVERY OF ALUMINUM CHLORIDE
Filed Jan. 25, 1922
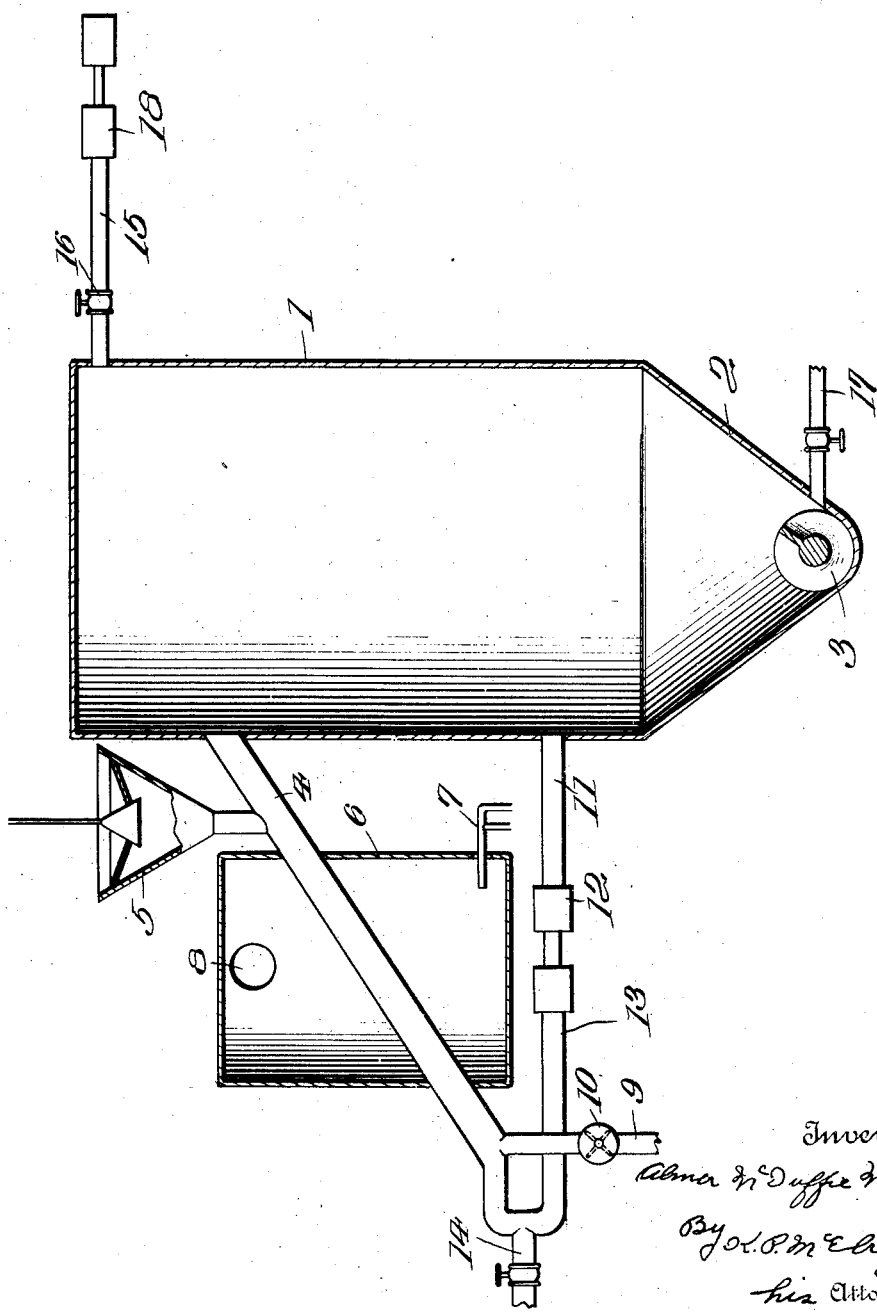

Patented Jan. 5, 1926.

1,568,171

UNITED STATES PATENT OFFICE.

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS.

RECOVERY OF ALUMINUM CHLORIDE.

Application filed January 25, 1922. Serial No. 531,611.

*To all whom it may concern:*

Be it known that I, ALMER McDUFFIE McAFEE, a citizen of the United States, residing at Port Arthur, in the county of Jefferson and State of Texas, have invented certain new and useful Improvements in the Recovery of Aluminum Chloride, of which the following is a specification.

This invention relates to the recovery of aluminum chloride; and it comprises a method of recovering active aluminum chloride from spent residues containing the same wherein such residues are heated to volatilize the chloride while removing the vapors as fast as formed, either by suction (vacuum) or a current of gas; all as more fully hereinafter set forth and as claimed.

Aluminum chloride is a hard crystalline rather volatile body, usually stated to boil at about 365° F. but having a considerable vapor tension at temperatures much below this. It is now used in various processes of treating mineral oils wherein its catalytic powers render it valuable. In one such process the mineral oil is heated with a small quantity of aluminum chloride, often about 5 per cent, and volatile oil (gasoline) distilled off. In another such process, the aluminum chloride is warmed with an oil at a comparatively low temperature, usually about 150° F., for the purpose of improving the character of the oil: saturating unsaturated compounds, lightening the color, etc. In all these methods the aluminum chloride after a certain time loses its activity and forms a sludge or what is known as an asphaltic residue or coky residue from which the aluminum chloride must be recovered. When a body of hot or warm oil is treated with a small amount of aluminum chloride, say 5 per cent, the chloride combines or melts down with a certain portion of the oil to form a heavy liquid immiscible with the rest of the oil. In the stated methods, this heavy liquid is kept stirred up through the oil by powerful agitating means. As the operation goes on the heavy liquid becomes thicker and more viscous until finally it is of asphaltic, tarry, or even coky consistency. Analysis of these residues shows that the aluminum chloride is still present in the sense that the residues contain aluminum and chlorine in the proportion to form $AlCl_3$; but the chloride has lost its catalytic activity.

In the usual methods of recovery these residues are heated progressively to a high temperature. The oil present first distils off and then the hydrocarbons are broken up or coked. Finally the aluminum chloride vaporizes. Vaporization of the aluminum chloride may be facilitated by the use of a little chlorine.

I have found that the aluminum chloride, or its hydrocarbon compounds, are sensibly volatile at temperatures much below those usually considered necessary in recovery and that in recovery it is not necessary to break up or coke the oily bodies present, if conditions be such as to maintain a minimum "partial pressure" of aluminum chloride, (or of its compounds with hydrocarbon) in the recovery. This may be done either by the application of suction (vacuum) or by passing a current of indifferent gas over the residue during heating. Under these conditions the aluminum chloride and the oil present volatilize, leaving coke and asphaltic hydrocarbons behind. Operating in this manner since I can work at comparatively low temperatures, I not only recover the aluminum chloride but also a certain amount of oil which would otherwise be lost. The aluminum chloride and the oil coming from the recovery apparatus condense together, forming a heavy oily liquid which may be used as an active catalyst in the stated methods of treating oil.

In the accompanying drawings showing one form of apparatus useful in the performance of my process and within the purview of my invention, The drawing is a diagrammatic sectional view.

Referring to the drawing, reference numeral 1 designates a cooling chamber of considerable capacity provided at its lower end with a basin or settling chamber in the nature of a sump 2 having the screw conveyor 3 operated by means outside of the chamber (not shown). Leading into the chamber at a relatively high point is the conduit 4 provided at a point along its length with a hopper 5 into which the aluminum chloride residue is fed either continuously or from time to time. The conduit 4 is heated advantageously at a point beyond the admission of the residue by means of the enclosing furnace or fire box 6 provided with oil and gas or other burners 7 and fire exit gas stack 8. At a point near its lower end this conduit 4 is provided with a line 9 for removal of coke and the like. This line 9 is provided with sealing device 10 which may be in the nature of a pocket valve or the like which is rotated by means extending outside of the line. Coke eliminated is sent to receptacle (not shown). In the conduit 4 vapors of aluminum chloride and hydrocarbon oil pass upwardly into the cooling or capacity chamber 1 while gases from the cooling chamber pass by line 11 to pump 12 from whence they are circulated through the line 13 back to the conduit 4. If desired additional gases may be admitted to this line 13 by the inlet 14, such gases being advantageously inert gases, such as nitrogen and the like. The action however, furnishes its own gases; the operation resulting in the establishment and maintenance of a body of inert gases in cyclic circulation. When there is development of excessive gases these may be vented from time to time or continuously through the outlet 15 leading from the cooling chamber suitably valved as at 16.

The operation of the apparatus is as follows: The aluminum chloride residue from gasoline making operation or one of the operations aforesaid, is delivered continuously into the hopper 5. The furnace 6 supplies the heat to the conduit 4 and the gases therein pass upwardly, which together with the heat extract the aluminum chloride and oil from the residue, which tends to tumble down the inclined conduit 4. The aluminum chloride and oil are separated in the cooling chamber, and condensed. They settle into the sump 2 from which they may be removed by means of the screw conveyor 3. The oil and aluminum chloride may be tapped off from the sump through the line 17. The gases of this reaction then pass through line 11 by means of the pump 12 to the line 13 and back to the conduit 4 being supplemented with other gases through the valved line 14. This pump 12 is not necessary in all cases, particularly where the process is run at such a speed or at such a temperature that convection currents are set up.

As has before been stated, the cooling chamber 1 is sealed.

When reliance is not placed totally upon the use of gases in the process, either those additionally admitted or those resulting from the reaction, the process operates under a vacuum; vacuum pump 18 being shown in communication with the drawoff line 15.

I regard the present invention as covering any method wherein these aluminum chloride residues are heated under conditions maintaining a minimal partial pressure of aluminum chloride vapors in the heating apparatus, thereby enabling volatilization of the aluminum chloride without much destruction of the accompanying oils.

What I claim is:—

1. In the simultaneous recovery of aluminum chloride and oil from oily residues containing the same, the process which consists in heating the same to a temperature sufficient to volatilize the chloride and maintaining a minimal partial pressure of aluminum chloride vapors in contact with said residue.

2. In the simultaneous recovery of aluminum chloride and oil from oily residues containing the same, the process which consists in heating the same to a temperature sufficient to volatilize the chloride and maintaining a minimal partial pressure of aluminum chloride vapors in contact with said residue by passing a current of inert gases over said residue.

3. In the recovery of aluminum chloride and oils from residues containing the same, the process which consists in heating such residue to a temperature sufficient to volatilize the chloride and accompanying oils while maintaining a minimal partial pressure of aluminum chloride vapors and oil vapors in contact with said residue.

4. In the recovery of anhydrous aluminum chloride from oily residues containing the same with simultaneous recovery of oil therefrom, the process which consists in heating such residues to a temperature sufficient to volatilize oils and aluminum chloride therefrom, while maintaining a minimal partial pressure of chloride vapors and oil vapors in the space above such residue by passing a current of inert gases over the residue being heated.

5. In the simultaneous recovery of aluminum chloride and oil from oily residues containing the same, the process which comprises establishing and maintaining a cyclic circulation of inert gases through a cooling chamber and a heating chamber and subjecting the oily residues containing aluminum chloride to heat in the heating chamber in the presence of the circulating gases.

6. In the simultaneous recovery of aluminum chloride and oil from oily residues containing the same, the process which comprises establishing and maintaining a cyclic circulation of inert gases through a cooling chamber and a heating chamber and subjecting the oily residues containing aluminum chloride to heat in the heating chamber in the presence of the circulating gases, the temperature being insufficient to produce complete carbonization of the oils in said residue.

In testimony whereof, I have hereunto affixed my signature.

ALMER McDUFFIE McAFEE.